(12) United States Patent
Ito et al.

(10) Patent No.: US 10,672,010 B2
(45) Date of Patent: Jun. 2, 2020

(54) MANAGEMENT SYSTEM

(71) Applicant: DENSO WAVE INCORPORATED, Chita-gun, Aichi-pref. (JP)

(72) Inventors: Kunihiko Ito, Aichi-pref (JP); Kenichi Yoshida, Aichi-pref (JP)

(73) Assignee: DENSO WAVE INCORPORATED, Chita-gun, Aichi-pref. (JP)

(*) Notice: Subject to any disclaimer, the term of this patent is extended or adjusted under 35 U.S.C. 154(b) by 348 days.

(21) Appl. No.: 15/669,435

(22) Filed: Aug. 4, 2017

(65) Prior Publication Data

US 2018/0060877 A1  Mar. 1, 2018

(30) Foreign Application Priority Data

Aug. 29, 2016 (JP) ................. 2016-166427

(51) Int. Cl.
*G06Q 30/00* (2012.01)
*G06K 7/10* (2006.01)
*G06K 7/14* (2006.01)
*G06K 9/46* (2006.01)
(Continued)

(52) U.S. Cl.
CPC ....... *G06Q 30/0185* (2013.01); *G06K 7/1092* (2013.01); *G06K 7/1417* (2013.01); *G06K 9/4652* (2013.01); *G06K 19/06037* (2013.01); *G06K 19/06103* (2013.01); *G06Q 30/018* (2013.01); *G06K 9/344* (2013.01);
(Continued)

(58) Field of Classification Search
CPC ....... G06Q 10/087; G06Q 10/08; G06Q 10/06

USPC ........................................... 235/385
See application file for complete search history.

(56) References Cited

U.S. PATENT DOCUMENTS 9,589,249 B1 * 3/2017 Janis .................... G06Q 10/087
2012/0187185 A1  7/2012 Sayan
(Continued)

FOREIGN PATENT DOCUMENTS

JP  2008-279060  11/2008
JP  2009-211448  9/2009
(Continued)

*Primary Examiner* — Ahshik Kim
(74) *Attorney, Agent, or Firm* — IP & T Group LLP

(57) ABSTRACT

A management system includes: an information terminal that reads an information code attached to a management target, the information code storing code identification information that specifies the management target; and a server communicable with the information terminal. The information terminal includes: a reading portion that optically reads display information including the information code; a position information acquisition portion that acquires position information of the information terminal; a terminal-side transmission portion that transmits the position information as reading position information to the server; and a notification portion that notifies predetermined information. The server includes: a storage portion that stores management information; a determination portion that determines whether the code identification information corresponds to information of the information code attached to the management target; and a server-side transmission portion that transmits a determination result to the information terminal. The notification portion notifies information with respect to the determination result.

10 Claims, 10 Drawing Sheets

(51) Int. Cl.
*G06K 19/06* (2006.01)
*G06K 9/34* (2006.01)
(52) U.S. Cl.
CPC .............. *G06K 2019/06253* (2013.01); *G06K 2209/03* (2013.01)

(56) References Cited

U.S. PATENT DOCUMENTS

| | | | |
|---|---|---|---|
| 2013/0145446 A1* | 6/2013 | Dorso | G06F 21/36 726/6 |
| 2014/0252077 A1 | 9/2014 | Corby | |
| 2015/0178521 A1 | 6/2015 | Ching | |
| 2015/0207796 A1* | 7/2015 | Love | H04L 63/10 600/345 |

FOREIGN PATENT DOCUMENTS

| | | |
|---|---|---|
| JP | 2012-141729 | 7/2012 |
| WO | 2014/098133 | 6/2014 |

\* cited by examiner

MANAGEMENT SYSTEM

CROSS REFERENCE TO RELATED APPLICATIONS

This application is based on Japanese Patent Application No. 2016-166427 filed on Aug. 29, 2016, the disclosure of which is incorporated herein by reference.

TECHNICAL FIELD

The present disclosure relates to a management system that manages a management target attached with an information code while using the information code.

BACKGROUND

Patent literature 1: JP 2012-141729 A
Patent literature 2: JP 2008-279060 A

For example, patent literature 1 discloses an authenticity determination system corresponding to a technology regarding a management system performing, while utilizing an information code, a management of a management target attached with the information code such as a management based on an authenticity determination of a product with the information code. According to the authenticity determination system, a pixel value of a first area and a pixel value of a second area where two colors having relation of metamerism are to be printed are specified for each band of multiple band images from the multiple band images obtained by capturing an image of an identification code to be printed in color using metamerism. A spectral reflection spectrum of the first area is presumed using a learning data of a color of the first area, and a pixel value for each band of the first area, and a spectral reflection spectrum of the second area is also presumed using a learning data of a color of the second area, and a pixel value for each band of the second area. Accordingly, an authenticity of the identification code is determined using the spectral reflection spectrum of the first area, which is presumed in this way, and the spectral reflection spectrum of the second area, which is presumed in this way. Thus, by using metamerism to perform an authenticity determination, a cheap and a comparatively strong system is tried to be constructed.

According to a forgery determination system disclosed in patent literature 2, based on whether individual identification information read from an information code that is engraved or the like to a tablet using individual identification information reading apparatus coincides with individual identification information stored in a medicine identification server apparatus, it is determined whether the tablet is counterfeit or not.

SUMMARY

The inventors of the present disclosure have found the following.

When an information code that indicates a product or the like attached with the information code is an official product is reproduced, and when a counterfeit attached with the reproduced information code is circulated, it may be difficult to easily determine whether the product is an official product. A reproduction of the information code which is generated in the above manner may be possible by analyzing and studying in detail the information code itself. Thus, it may be difficult to produce an information code itself not to be reproduced. This difficulty may be in common with a management using an information code with respect to a management target with the information code attached thereto such as determination whether a product using the information code have been registered or not, not only a case of the authenticity determination of a product or the like using the information code. A reliability regarding a management of a management target using an information code may be spoiled.

It is an object of the present disclosure to provide a technology improving reliability with respect to a management of a management target using an information code.

According to one aspect of the present disclosure, a management system is provided. The management system includes: an information terminal that reads an information code attached to a management target, the information code storing code identification information that specifies the management target; and a server that is communicable with the information terminal. The information terminal includes: a reading portion that optically reads display information including the information code; a position information acquisition portion that acquires position information of the information terminal; a terminal-side transmission portion that transmits the position information acquired by the position information acquisition portion as reading position information together with the code identification information to the server, when the reading portion reads the code identification information; and a notification portion that notifies predetermined information. The server includes: a storage portion that stores management information with respect to the management target; a determination portion that determines whether the code identification information received from the information terminal corresponds to information of the information code attached to the management target, based on the reading position information received with the code identification information, a reading time that is considered that the code identification information has been read, and the management information stored in the storage portion; and a server-side transmission portion that transmits a determination result by the determination portion to the information terminal. The notification portion notifies information with respect to the determination result received from the server.

According to another aspect of the present disclosure, a management system is provided. The management system includes: an information terminal that reads an information code attached to a management target, the information code storing code identification information that specifies the management target; and a server that is communicable with the information terminal. The information terminal includes: a reading portion that optically reads display information including the information code; a terminal-side transmission portion that transmits to the server, the code identification information read by the reading portion; and a notification portion that notifies predetermined information. The server includes: a storage portion that stores management information with respect to the management target, the management information including a number of times of reception of the code identification information received from the information terminal; a determination portion that determines whether the code identification information received from the information terminal corresponds to information of the information code attached to the management target, based on the management information including the number of times of reception stored in the storage portion with respect to the code identification information; and a server-side transmission portion that transmits a determination result by the determination portion to the information terminal. The notification portion notifies information with respect to the determination result received from the server.

According to this configuration, in the information terminal, the code identification information read by the reading portion is transmitted together with the reading position information acquired by the position information acquisition portion to the server. In the server, regarding whether the code identification information received from the information terminal corresponds to the information of the information code attached to the management target, the determination portion determines based on the reading position information and the reading time received together with the code identification information and the management information stored in the storage portion. The determination result is transmitted to the information terminal. Thereby, the notification portion of the information terminal notifies the information regarding the determination result received from the server.

Accordingly, the server makes the determination while considering a position and time that the information code has been read. Thus, when the same code identification information is concurrently read at clearly difference places, it may be possible to notify a possibility that the code identification information does not correspond to the information of the information code attached to the management target. That is, it may be possible to notify a user of the information terminal of a possibility that the information terminal reads an information code that has been forged. Thus, it may be possible to improve a reliability regarding the management of the management target utilizing the information code.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Hereinafter, a first embodiment in a management system according to the present disclosure will be explained with reference to drawings.

A management system 10 according to the present embodiment includes a system for performing a management with use of an information code with respect to a management target to which the information code is attached. More specifically, in the management system 10, the information code is attached to the management target, such as expensive product to which a counterfeit measure is required so as to utilize the information code. Thereby, the management system 10 performs an authenticity determination for the management target is performed.

Figure 1:
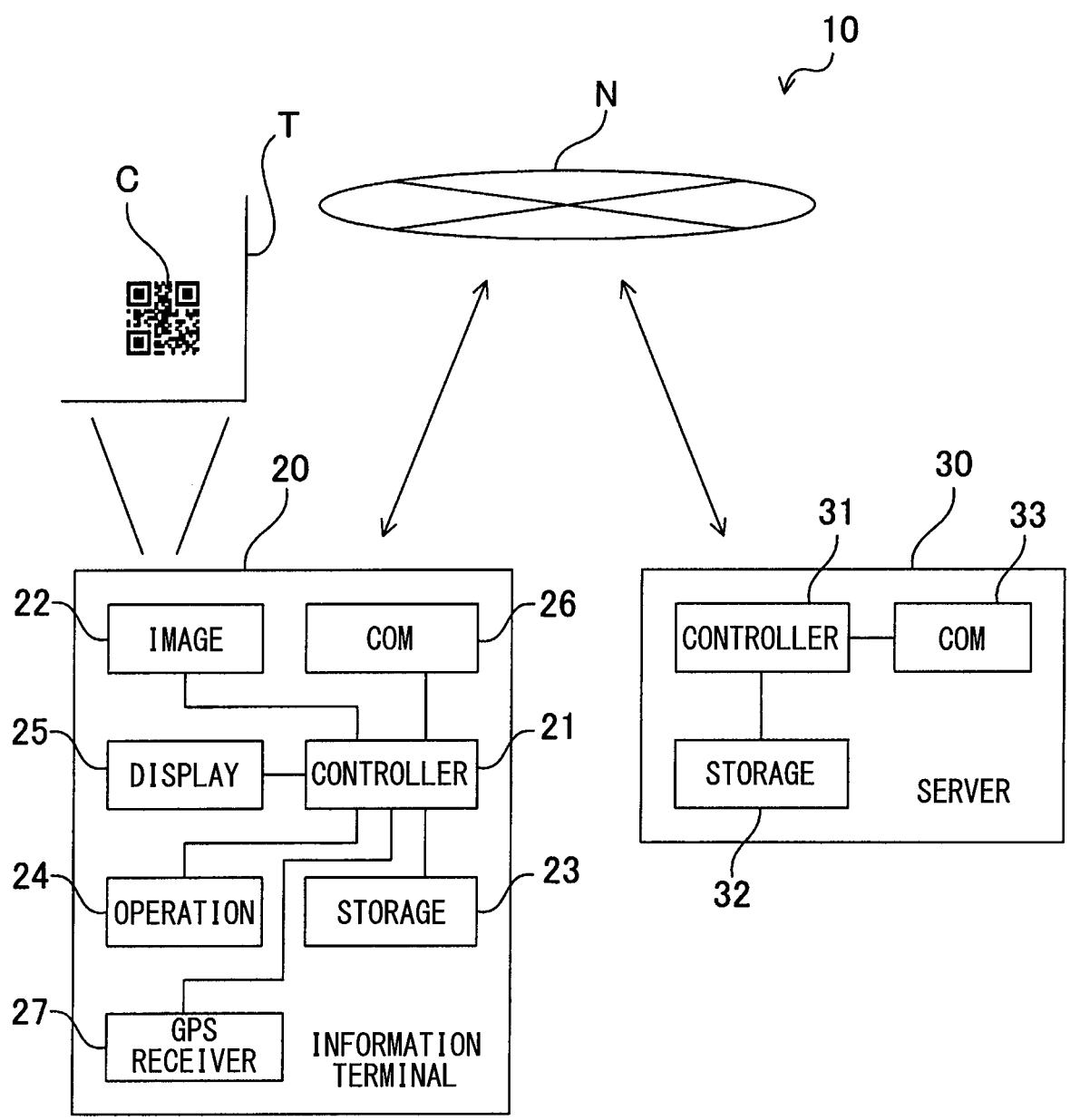
FIG. 1 is a diagram schematically explaining a configuration of a management system according to a first embodiment.

The management system 10, as illustrated in FIG. 1, includes one or more portable information terminal 20 that optically reads an information code C added to a management target T, and a server 30 that is communicable with each information terminal 20. The information terminal 20 and the server 30 are configured to be communicable with each other via a network N such the Internet. Incidentally, in FIG. 1, only one information terminal 20 is illustrated, and an illustration of another information terminal 20 is omitted, for convenience.

First, the information code C used by the management system 10 will be explained.

The information code C according to the present embodiment functions as a mark (or a sign) illustrating that a product (also referred to goods) attached with the information code C corresponds to a management target T. In general, the information code C is not added to a non-management target, which is a product not an official product. The information code C is generated by storing code identification information for specifying a management target T such as a product or the like to which the information code C is attached. The information code C is configured by placing multiple types of cells having different colors, different density, or different brightness. Specifically, in the present embodiment, as the information code C, a QR code (registered trademark) including two kinds of cells having a bright color cell and a dark color cell are arranged is used, for example.

The information code C is encrypted, so that an information terminal 20 executing a predetermined application program can read the information code C, and a general reading apparatus cannot read the information code C.

Next, a configuration of the information terminal 20 will be explained.

The information terminal 20 is held by a user who wants to have notification about a result of an authenticity determination or the like. The information terminal 20 is configured by installing the predetermined application program provided by an operating company or the like of the management system 10 for a portable terminal having a camera function such as smart phone.

The information terminal 20 includes an imaging portion 22 and a controller 21. The imaging portion 22 is configured as a camera having a light reception sensor such as a C-MOS area sensor, CCD area sensor, or the like. The controller 21 processes image data captured based on a pixel signal from the imaging portion 22. The controller 21 is mainly configured from a microcomputer, and has CPU, a system bath, an input and output interface, or the like, and functions as an information processor with storage portion 23. The storage portion 23 is configured by known semiconductor memory, such as ROM, RAM, and a non-volatile memory, and the predetermined application program or the like is stored in the storage portion 23 to be executable by the controller 21.

In addition, the information terminal 20 has an operation portion 24, a display portion 25, and a communication portion 26. The operation portion 24 is configured by various keys, a touch panel, or the like. The operation portion 24 inputs information according to an operation of the operation portion 24 to the controller 21. The display portion 25 is configured by a liquid crystal or the like. The display portion 25 is controlled by the controller 21 so that the display portion 25 displays predetermined information such as information obtained from the imaging of the information code, determination result obtained from the server 30 to notify a user or the like. The communication portion 26 is controlled by the controller 21, and corresponds to communication means to perform wireless communication with the server 30 or the like via the network N. Especially, the communication portion 26 functions as a terminal-side transmission portion that transmits predetermined information to the server 30. The communication portion 26 may be an example of a communication means, and a terminal-side transmission means, and a terminal-side transmission portion.

The information terminal 20 has a GPS receiver 27. The GPS receiver 27 is configured to output a signal received from a known GPS satellite to the controller 21, as position information for specifying the current position of the information terminal 20. Incidentally, the GPS receiver 27 may correspond to an example of a position information acquisition means and a position information acquisition portion.

The information terminal 20 configured in this way images display information such as an information code and text information by the imaging portion 22, and optically reads the display information by using known decoding process and a symbol recognition process function (OCR), which are made by the controller 21. When the imaging portion 22 images the information code C and the controller 21 performs the decoding process to the imaged image, the information terminal 20 reads code identification information stored in the information code C. The controller 21 and the imaging portion 22 may correspond to an example of a reading means and a reading portion.

In the information terminal 20, the controller 21 executes the predetermined application program so as to perform the reading process. According to the reading process, the information terminal 20 transmits the code identification information or the like, which is read from the information code C, to the server 30, and in accordance with the transmission, the server 30 transmit information including a result of the authenticity determination. Based on the information received from the server 30, the result of the authenticity determination of the management target T attached with the information code C is notified to the information terminal 20. The detail of the reading process will be described later.

Next, the configuration of the server 30 will be explained.

The server 30 performs, based on the information received from the information terminal 20, the authenticity determination whether the information code imaged by the information terminal 20 is the information code C attached to the management target T, and is configured to be a computer that transmits the determination result to the information terminal 20. Specifically, the server 30 transmits affirmation determination information to the information terminal 20 as a determination result, when the code identification information received from the information terminal 20 is determined to be the information on the information code C attached to the management target T. The server 30 transmits negative determination information to the information terminal 20 as a determination result, when the code identification information received from the information terminal 20 is determined not to be the information on the information code C attached to the management target T.

The server 30 is mainly provided with a storage portion 32, a communication portion 33, and a controller 31 that integrally controls the storage portion 32 and the communication portion 33. The controller 31 is mainly configured from a microcomputer, and has CPU, a system bath, an input and output interface, or the like, and functions as an information processor with the storage portion 32. The storage portion 32 is configured by known semiconductor memory, such as ROM, RAM, and a non-volatile memory. The storage portion 32 stores in advance an application program, a predetermined database for performing the authenticity determination process based on the information received from the information terminal 20 so as to be used by the controller 31. The communication portion 33 is controlled by the controller 31, and has a function that communicates with each information terminal 20 or other external apparatus via the network N.

In the present embodiment, the storage portion 32 includes a database for performing the authenticity determination process about the management target T to which the information code C imaged by the information terminal 20 is attached. The database stores information including reading position information (hereinafter, also referred to as a previous reading position information) and its reading time (hereinafter, also referred to as a previous reading time) at the previous time of reading for each code identification information as at least part of the management information about the management target T. At first, the reading position information and the reading time according to a manufacturing place, shipment time, or the like are written in the database about the code identification information of the information code C at the time of the shipment of the management target T. And when it is determined that the code identification information received from the information terminal 20 includes the information of the information code C attached to the management target T, the database is updated so that the reading position information and its reading time received with the code identification information are overwritten about the code identification information. The storage portion 32 may correspond to an example of a storage means.

Next, in the management system 10 configured in this manner, process executed in the information terminal 20 and the server 30 in the authenticity determination about the management target T by using the information code C will be described in detail by referring to FIG. 2 and FIG. 3.

The controller 21 in the information terminal 20 held by the user executes the predetermined application program to perform the reading process. The reading process will be explained in detail with reference to a flowchart of FIG. 2.

It is supposed that a predetermined key operation is performed to the operation portion 24 by the user who would like to know the authenticity determination result of the management target T attached with the information code C. In this case, the controller 21 executes the predetermined application program, and starts the reading process. The imaging process illustrated at S101 in FIG. 2 is performed when a camera of the imaging portion 22 faces the information code C and an operation for imaging is performed, so that the information code C is imaged by the imaging portion 22. Then, a decryption process illustrated in S103 is performed, and a decoding process is performed to the code image of the information code C imaged by the imaging portion 22 by using information or the like for decoding the encryption and included in the predetermined application program.

According to this process, the code identification information is decoded (S105: YES). At the transmission process illustrated in S107, information including the decoded code identification information, the present position information obtained by the GPS receiver 27 (hereinafter, also referred to as a reading position information), and present reading time when the information code C has been read, is transmitted to the server 30 via the communication portion 26. By contrast, when the decoding of the information code C is failed, it is determined to be No at S105. In this case, the process returns to S101.

When the determination result is received via the communication portion 26 from the server 30 according to the transmission (S109: Yes), the notification process illustrated in S111 will be made. In the notification process, the information about the received determination result is displayed by the display portion 25, and is notified for the user.

Figure 4A:
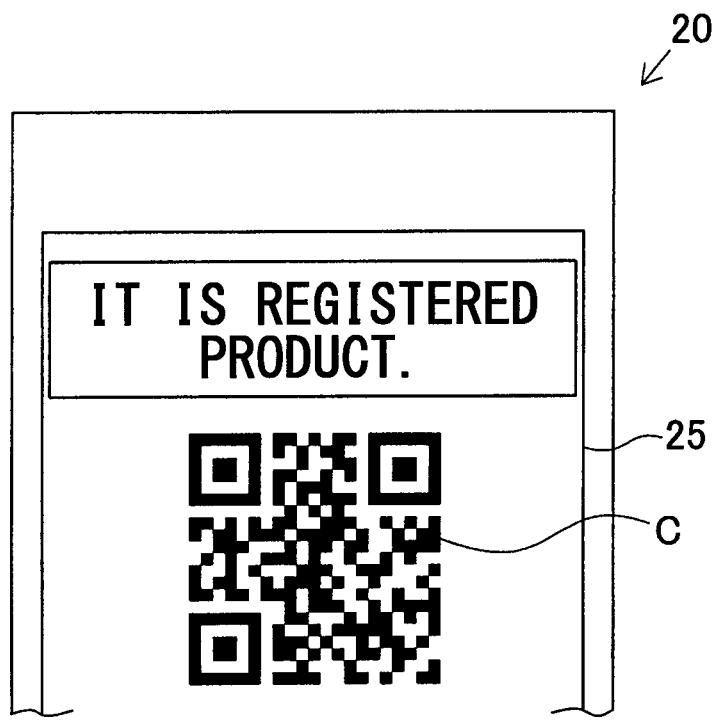
FIG. 4A is a diagram exemplifying notification contents of a determination result displayed on a display portion of the information terminal, and showing the notification contents at the time an information code attached to the management target is imaged.

Specifically, when the affirmation determination information is received from the server 30, the message "it is a registered product" is displayed and notified to the display portion 25 as exemplified in FIG. 4A. Thereby, the user of the information terminal 20 can recognize that the product to which the information code C imaged is attached corresponds to the registered regular management target. Incidentally, when the affirmation determination information is received, information suitable for a use environment or the like such text information "it is an official product" may be displayed and reported, for example. Furthermore, the affirmation determination information may include the information to be notified to the user such as information about a campaign application (also referred to as an advertisement application), and the information may be displayed on the display portion 25 to be notified.

Figure 4B:
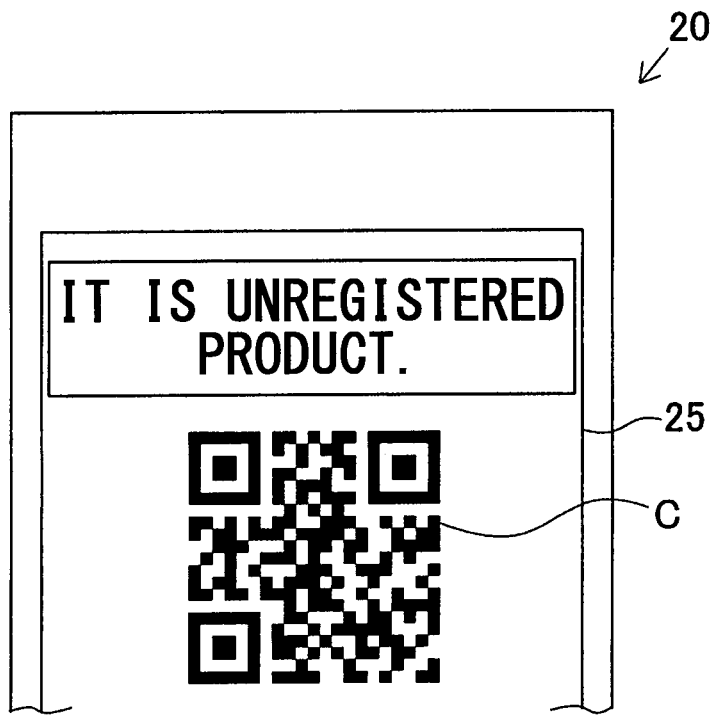
FIG. 4B is a diagram exemplifying notification contents of a determination result displayed on a display portion of the information terminal, and showing the notification contents at the time an information code different from the management target is imaged.

On the other hand, when the negative determination information is received from the server 30, the text information "it is an unregistered product" is displayed and reported to the display portion 25 as exemplified in FIG. 4B. Thereby, the user of the information terminal 20 can recognize that there is a possibility that a product to which the captured information code C is attached corresponds to a counterfeit, which is not registered or is an irregular product. When the negative determination information is received, information suitable for a use environment such as text information "warning" or "there is a possibility of a counterfeit" may be displayed and reported, for example.

The notification process may make a notification using not only displaying by the display portion 25, but also lighting or blinking of a light emission portion, vibration of a vibrator, making a beep sound of a buzzer (not illustrated), or the like. The display portion 25, the light emission portion, the vibrator, and the buzzer may correspond to an example of notification means and a notification portion.

The authenticity determination process performed by the controller 31 of the server 30 will be explained in detail using the flow chart shown in FIG. 3.

The server 30 performs process for receiving information from the information terminal 20. When the server 30 receives the code identification information, the reading position information, and the reading time, or the like from the information terminal 20 (S201 in FIG. 3: Yes), the reading process illustrated in S203 is performed. According to the reading process, the reading position information and the reading time stored as the management information in the storing portion in association with the received code identification information are read from the database as the previous reading position information and the previous reading time.

Next, at a determination process illustrated at S205, it is determined whether the received code identification information includes information of the information code C which is attached to the management target T, based on the reading position information (referred to as a present reading position information) in this time and the reading time (referred to as a present reading time) in this time, which are received with the code identification information, and the previous reading position information and the previous reading time, which have been read from the database. Specifically, in comparison with the present reading position information and the present reading time and the previous reading position information and the previous reading time, it is determined whether a time TA required for movement from the previous reading position to the present reading position is longer than an elapsed time TB from the previous reading time to the present reading time (the reading time in this time). In other words, it is supposed that the time TA required for the movement from the previous reading position to the present reading position is not longer than the elapsed time TB, which corresponds to a time from the previous reading time to the present reading time. In this case, it is possible to determine that the received code identification information corresponds to the information code C attached with the management target T, by determining that the information code C of the management target T placed in the same position as the previous time is read or by determining that the information code C of the management target T that has been moved is read. Incidentally, the time TA required for the movement from the previous reading position to the present reading position may correspond to a time required on foot, for example. By contrast, it is supposed that the time TA required for the movement from the previous reading position to the present reading position is longer than the elapsed time TB, which corresponds to a time from the previous reading time to the present reading time. In this case, it is possible to determine that the information code may be forged and attached to a non-management target different from the management target T is read. The case where the time TA is longer than the elapsed time TB may correspond to a case where the identical code identification information is concurrently read at clearly difference places, or a case where a code identification information read in the previous time within a country is again read in another country after a relatively short period of time (for example, a half day).

When it is determined that the time TA required for the movement from the previous reading position to the present reading position is not longer than the elapsed time TB from the previous reading time to the present reading time (S205: No), it is determined that the received code identification information corresponds to the information of the information code C that is attached to the management target T. In this case, the process shifts to S207 to perform a first notification process. In this process, the affirmation determination information is transmitted and notified to the information terminal 20 via the communication portion 33. Next, the update process illustrated at S209 is performed, so that the database of the storage portion 32 is updated, and the reading position information and the reading time received at S201 is overwritten for the code identification information. In other words, the storage portion 32 stores, as a part of the management information, the reading position information and the reading time at the previous received time for the code identification information associated with the code identification information.

By contrast, when it is determined that the time TA, which corresponds to time required for the movement from the previous reading position to the present reading position is longer than the elapsed time TB, which corresponds to time from the previous reading time to the present reading time (S205: Yes), it is determined that the received code identification information does not correspond to the information of the information code C added to the management target T. In this case, the process shifts to S211, and a second notification process is performed. In the second notification process, the negative determination information is notified to the information terminal 20 via the communication portion 33.

Incidentally, when neither reading position information nor reading time is written in a database about the received code identification information, it is determined that the code identification information corresponds to the information code C of the management target T that is not shipped (for example, before shipping). The negative determination information is transmitted and notified to the information terminal 20 via the communication portion 33.

The server 30 may consider as the reading time, a time when the code identification information or the reading position information has been received from the information terminal 20, instead of a time receiving the reading time from the information terminal 20. With this, the information terminal 20 does not require the transmission of the reading time at the transmission process (S107). Incidentally, the controller 31 performing the determination process at S205 may correspond to an example of a determination means and a determination portion, and the communication portion 33 may correspond to an example of a server-side transmission means and a server-side transmission portion.

Thus, in the management system 10 according to the present embodiment, the information terminal 20 transmits to the server 30, the code identification information imaged and read by the imaging portion 22, and the reading position information or the like acquired by the GPS receiver 27. The server 30 determines whether the code identification information received from the information terminal 20 corresponds to the information of the information code C attached to the management target T, based on the reading position information and the reading time received together with the code identification information and the management information (the previous reading position information, and the previous reading time) stored in the storage portion 32. The information terminal 20 notifies by the notification means such as the display portion 25 or the like, the information about the determination result received from the server 30.

Accordingly, since the server 30 makes the determination while considering the position where the information code C is read and the time when the information code C is read, it may be possible to notify a possibility that the code identification information does not correspond to the information of the information code C attached to the management target T when the same code identification information are concurrently read at clearly different places. In other words, it may be possible to notify a user of the information terminal 20 of a possibility that the information terminal 20 reads the information code, which has been forged or the like. Thus, it may be possible to improve reliability regarding the management of the management target T utilizing the information code C.

Especially, regarding whether the code identification information received from the information terminal 20 corresponds to the information of the information code C attached to the management target T, the present reading position information and the present reading time received together with the code identification information are respectively compared with the previous reading position information and the previous reading time stored in the storage portion 32 in association with the code identification information. When the time TA required for the movement from the previous reading position to the present reading position is longer than the elapsed time TB from the previous reading time to the present reading time, it is determined that the code identification information does not correspond to the information code attached to the management target (S205: Yes).

Thus, when the time TA required for the movement from the previous reading position to the present reading position is longer than the elapsed time TB from the previous reading time to the present reading time, it may be likely that the information code not to be the management target is read. Thus, in this case, it may be possible to notify a user of the information terminal 20 of a determination result in which the code identification information does not correspond to the information of the information code attached to the management target, that is, a possibility that a forged information code is read.

Incidentally, the information code C showing that a product corresponds to a management target may be printed to a label or the like that is pasted and used. Thereby, instead of attaching to the management target T at the time of manufacturing of the management target T, the information code C may be attached at the time of shipment or at the time after shipment, for example. Therefore, even when a product does not correspond to the management target at the time of manufacturing and the product becomes the management target after that, it may be possible to attach the information code C to the management target T, and it may be possible to manage the product by the management system 10 thereafter.

Second Embodiment

A management system according to a second embodiment of the present disclosure will be explained with reference to FIG. 5.

The management system 10 according to the second embodiment determines, based on the number of times the code identification information is received, whether the received code identification information corresponds to the information of the information code C attached to the management target T. The substantially same configuration in the management system with the first embodiment is given by the identical numerals, and explanations will be omitted.

When the same code identification information is repeatedly read in a short period of time, it is presumed that the information code is excessively forged and a reading evaluation work (a read assessment) is performed. According to the present embodiment, the database of the storage portion 32 stores the number of times of reception Na for each code identification information as a part of the management information regarding the management target T. In the authenticity determination process in the server 30, it is determined, based on the number of times of reception of the code identification information, whether the received code identification information corresponds to the information of the information code C attached to the management target T.

Incidentally, in the present embodiment, since the reading position information that is required in the first embodiment becomes unnecessary, it may be possible to perform the authenticity determination regarding the management target as the management system 10 even when an information terminal does not include the GPS receiver 27.

Hereinafter, in the management system 10 configured in this way, process executed in the information terminal 20 and the server 30 in the authenticity determination about the management target T by using the information code C will be described in detail by referring to FIG. 2 and FIG. 5.

Figure 2:
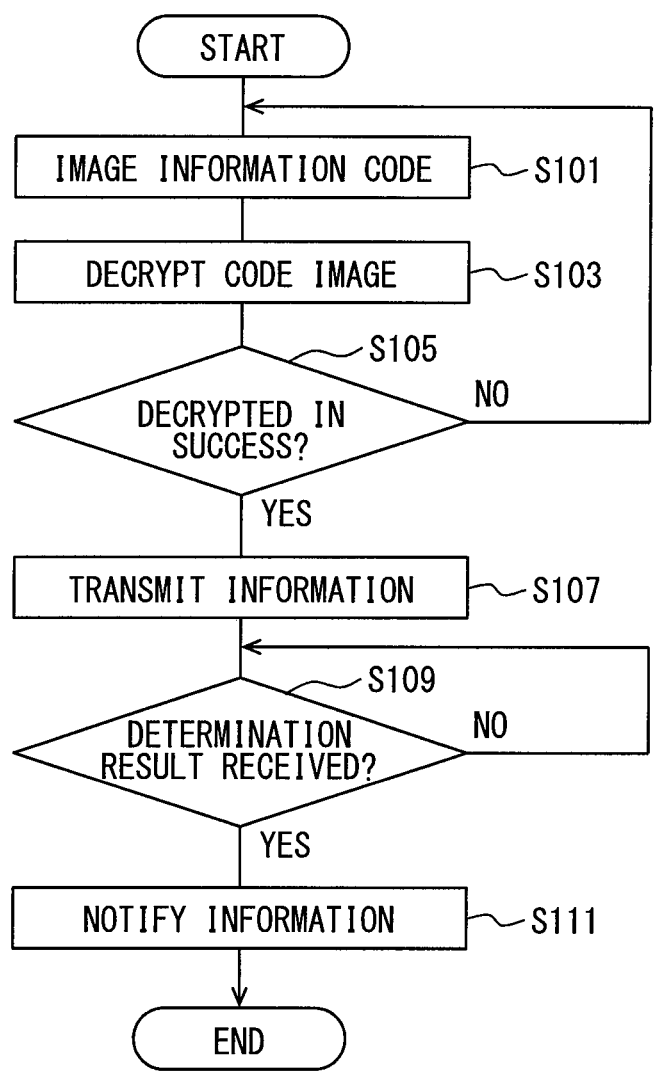
FIG. 2 is a flowchart exemplifying a flow of a reading process by a controller of an information terminal according to the first embodiment.
Figure 3:
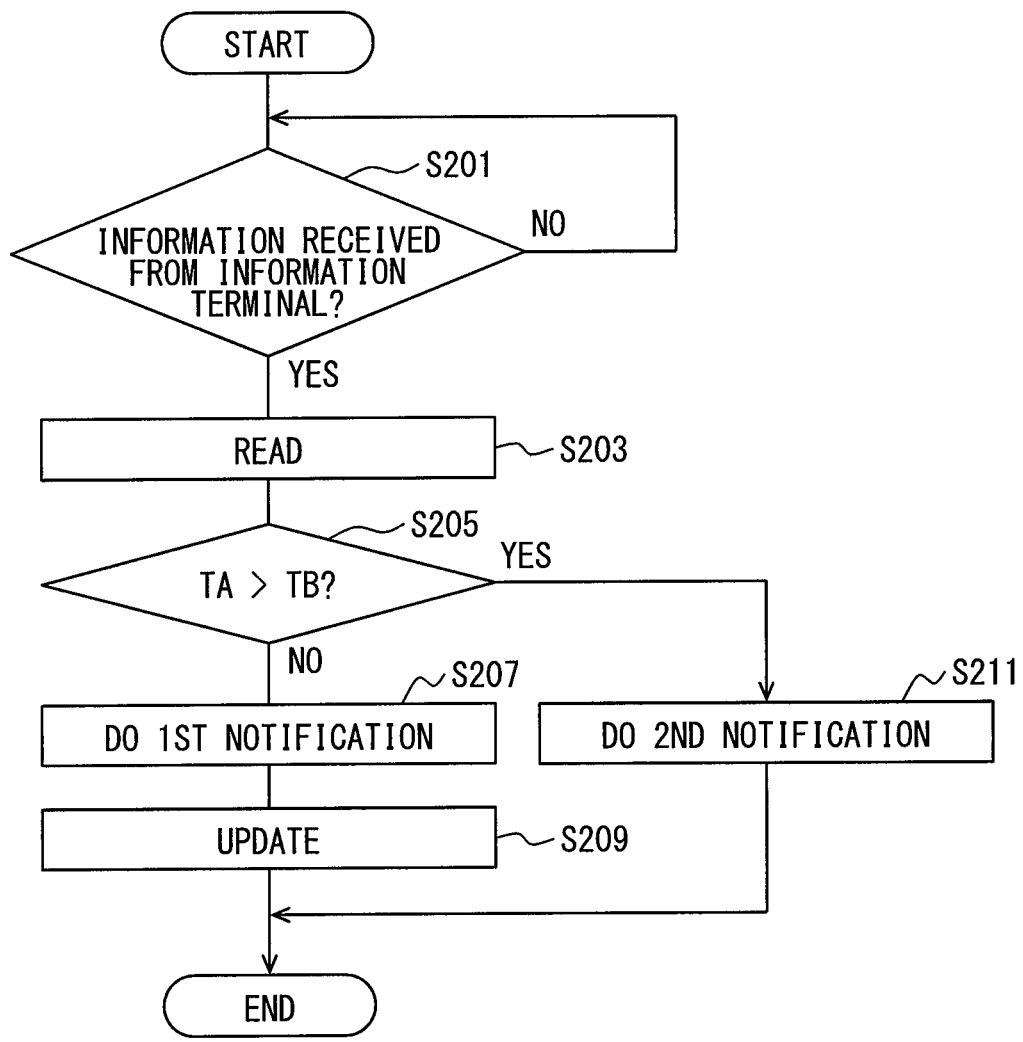
FIG. 3 is a flowchart exemplifying a flow of an authenticity determination process by a controller of a server according to the first embodiment.

In the reading process of the information terminal 20, when the code identification information is decoded (S105 of FIG. 2: Yes), the process shifts to S107. At a transmission process of S107, information including the decoded code identification information is transmitted to the server 30. When the information terminal 20 receives the determination result from the server 30 in accordance with the transmission of S107 (S109: Yes), the notification process illustrated in S111 is performed. As similar with the first embodiment, the display portion 25 displays the received determination result to notify a user of the determination result.

The authenticity determination process performed by the controller 31 of the server 30 will be explained in detail using the flow chart shown in FIG. 5.

Figure 5:
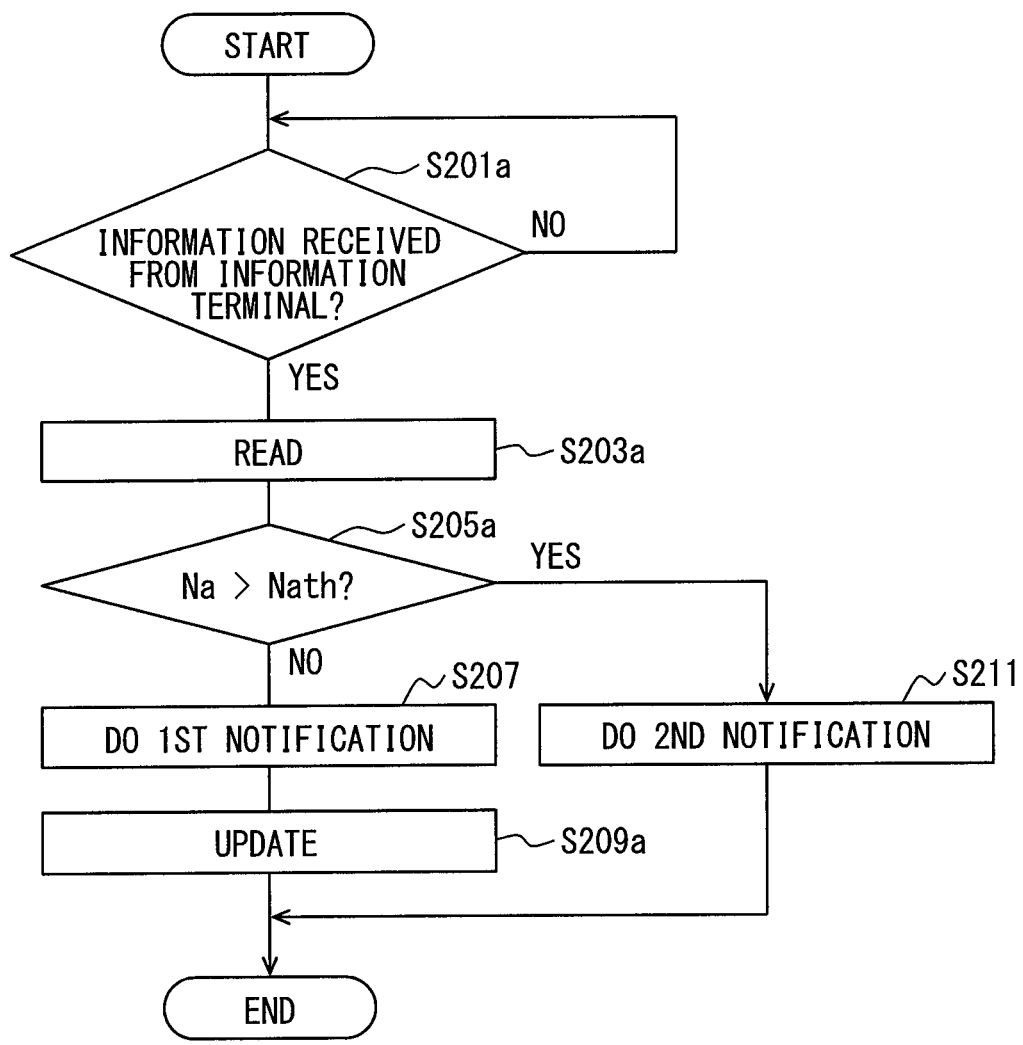
FIG. 5 is a flowchart exemplifying a flow of an authenticity determination process by the controller of the server according to a second embodiment.

When receiving the code identification information from the information terminal 20 through the communication portion 33 (S201a of FIG. 5: Yes), the server 30 performs the reading process illustrated at S203a. In the reading process, the number Na of times of reception stored in the storage portion 32 associated with the received code identification information is read out from the database.

Next, at a determination process illustrated at S205a, it is determined whether the received code identification information includes the information of the information code C attached to the management target T, based on the number Na of times of reception read from the database with regard to the code identification information. Specifically, when the number Na of times of reception, which has been read, is not greater than a predetermined number Nath of times (S205a: No), it is determined that the received code identification information corresponds to the information of the information code C attached to the management target T, and the process shifts to S207. At S207, a first notification process is performed. With this, the affirmation determination information is transmitted to the information terminal 20 as similar to the first embodiment. Next, the update process shown at S209a is performed, so that the database of the storage portion 32 is updated, and the number Na of times of reception of the code identification information is incremented (Na=Na+1). The above predetermined number Nath of times may be set arbitrarily in accordance with use environment.

By contrast, when the number Na of times of reception, which has been read, exceeds the predetermined number Nath of times (S205a: Yes), it is presumed that an information code is excessively forged and a reading evaluation (read assessment) is performed. In this case, it is determined that the received code identification information does not correspond to the information of the information code C attached to the management target T, and the process shifts to the second notification process as illustrated in S211. Incidentally, the controller 31 performing the determination process of S205a may correspond to an example of a determination means and a determination portion.

As explained above, in the management system 10 according to the present embodiment, the information terminal 20 transmits to the server 30, the code identification information imaged and read by the imaging portion 22. The server 30 determines whether the code identification information received from the information terminal 20 corresponds to the information of the information code C attached to the management target T, based on the number Na of times of reception stored in the storage portion 32 with regard to the code identification information, and the server 30 transmits the determination result to the information terminal 20. The information terminal 20 notifies by the notification means such as the display portion 25 or the like, the information about the determination result received from the server 30.

Accordingly, the server 30 makes the determination while considering the number Na of times of reception of the code identification information. When the same code identification information is repeatedly read, it is presumed that a read evaluation work of the information code, which is excessively forged, is performed. It may be possible to notify a possibility that the code identification information does not correspond to the information of the information code attached to the management target T. In other words, it may be possible to notify a user of the information terminal 20 of a possibility that the information terminal 20 reads the information code, which has been forged or the like. Thus, it may be possible to improve reliability regarding the management of the management target T utilizing the information code C.

Incidentally, the authenticity determination process performed in the controller 31 of the server 30 may perform the above described determination further considering the reading position information and the reading time as described in the first embodiment, in addition the number Na of times of reception. Specifically, in accordance with use environment, for example, when it is determined to be No at both of S205 and S205a, the process at and after S207 may be performed. When it is determined to be Yes in at least one of S205 or S205a, the process at S211 and after S211 may be performed. Alternatively, when it is determined to be Yes at both S205 and S205a, the process at S211 and after S211 may be performed. When it is determined to No at S205 or S205a, the process at S207 and after S207 may be performed.

With this, for example, when the same code identification information is repeatedly read, it may be possible to presume the reading as the read evaluation work of the excessively forged information code even in a particular area. Thus, it may be possible to notify a possibility that the code identification information does not correspond to the information of the information code attached to a management target. Accordingly, it may be possible to further improve reliability regarding the management of a management target T utilizing the information code C.

Third Embodiment

A management system according to a third embodiment of the present disclosure will be explained with reference to FIG. 6.

The management system 10 according to the third embodiment determines, based on the number of information terminals that have read the same code identification information in addition to the above described reading position information, the reading time, and the number Na of times of receptions, regarding whether the received code identification information corresponds to the information of the information code C attached to the management target T. The substantially same configuration in the management system with the second embodiment is given by the identical numerals, and explanations will be omitted.

When the same code identification information is repeatedly read by various different information terminals 20, it is presumed that an information code is excessively forged and a reading evaluation work is performed. Therefore, according to the present embodiment, the database of the storage portion 32 stores the number Nb of the information terminals 20 that have read the same code identification information as a part of the management information in association with the code identification information. In the authenticity determination process in the server 30, it is determined, based on the number Nb of the information terminal 20 stored in the storage portion 32, whether the received code identification information corresponds to the information of the information code C attached the management target T. In the database of the storage portion 32, the number Nb of the information terminals is not incremented when an information terminal 20 having the same terminal identification information reads the same code identification information. One or more terminal identification information is associated with the code identification information and the number Nb of information terminals. The storage portion 23 of the information terminal 20 stores terminal identification information for specifying the information terminal 20.

Hereinafter, in the management system 10 configured in this way, process executed in the information terminal 20 and the server 30 in the authenticity determination about the management target T by using the information code C will be described in detail by referring to FIG. 2 and FIG. 6.

In the reading process of the information terminal 20, when the code identification information is decoded (S105: Yes), the process shifts to S107. At the transmission process of S107 in FIG. 2, the information including the decoded code identification information, the reading position information, the reading time, and the terminal identification information stored in the storage portion 23 are transmitted to the server 30. When the information terminal 20 receives the determination result from the server 30 in accordance with the transmission (S109: Yes), the notification process illustrated in S111 is performed. As similar with the first embodiment, the display portion 25 displays the received determination result to notify a user of the determination result.

The authenticity determination process performed by the controller 31 of the server 30 will be explained in detail using the flow chart shown in FIG. 6.

Figure 6:
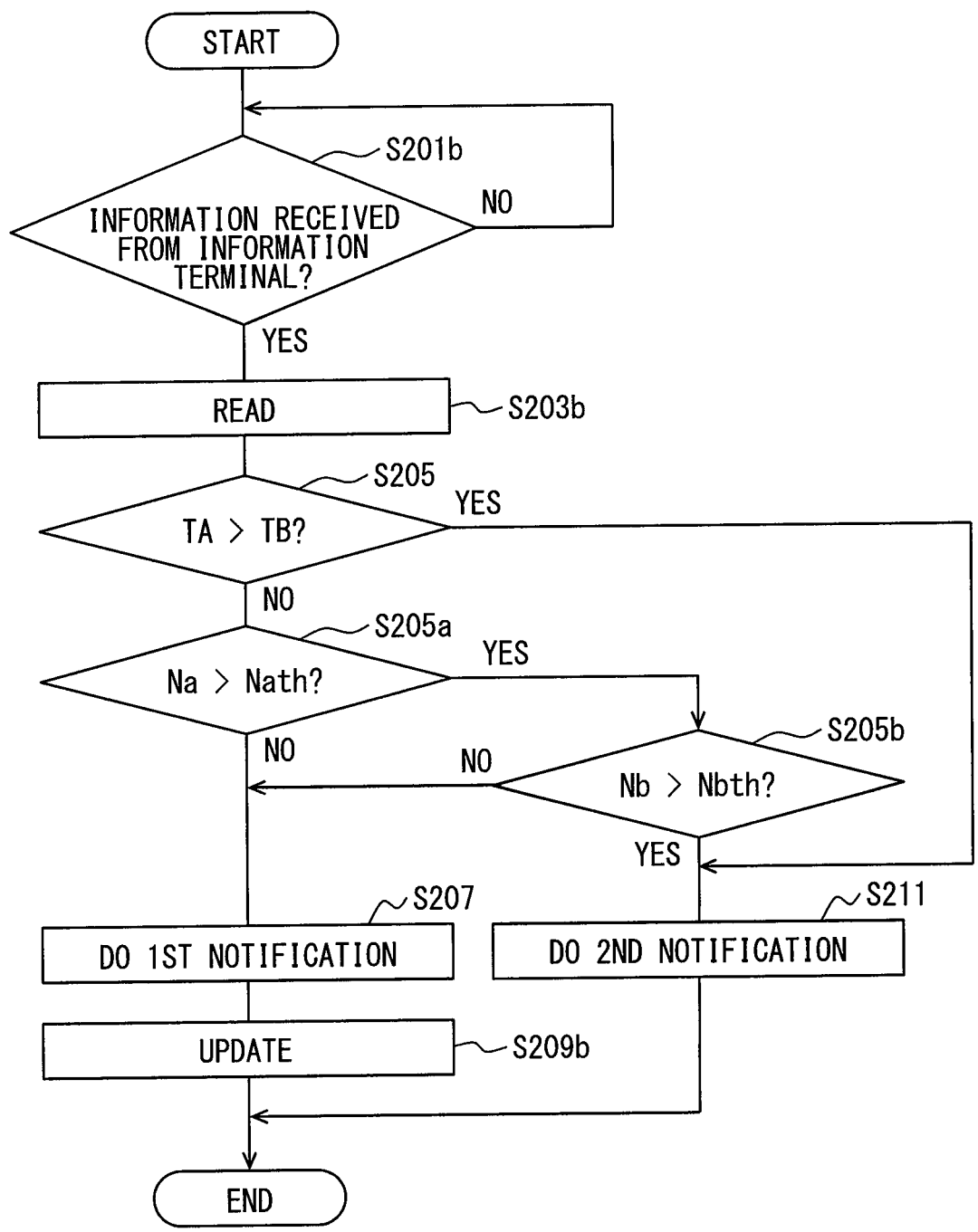
FIG. 6 is a flowchart exemplifying a flow of an authenticity determination process by the controller of the server according to a third embodiment.

When receiving the code identification information, the reading position information, the reading time, and the terminal identification information from the information terminal 20 through the communication portion 33 (S201b of FIG. 6: Yes), the server 30 performs the reading process illustrated at S203b. In the reading process, the reading position information, the reading time, the number Na of times of receptions and the number Nb of information terminals, which are stored in the storage portion 32 in association with the received code identification information, are read from the database.

Following S203b, in the determination process illustrated in S205, when it is determined that the time TA required for the movement from the previous reading position to the present reading position is longer than the elapsed time TB from the previous reading time to the present reading time (S205: Yes), it is determined that the received code identification information does not correspond to the information of the information code C attached to the management target T. In this case, the process shifts to S211, and a second notification process is performed.

By contrast, when it is determined that the time TA required for the movement from the previous reading position to the present reading position is not longer than the elapsed time TB from the previous reading time to the present reading time (S205: No), the process shifts to S205a. At S205a, it is determined whether the number Na of times of reception is not greater than a predetermined number Nath of times. When it is determined that the number Na of times of reception readout is not greater than the predetermine number Nath of times (S205a: No), it is determined that the received code identification information corresponds to the information of the information code C attached to the management target T. In this case, the process shifts to S207 to perform the first notification process.

At S205a, when it is determined that the number Na of times of reception, which has been read, exceeds the predetermined number Nath of times (S205a: Yes), the process shifts to S205b. The determination process illustrated at S205b determines whether the number Nb of information terminals, which has been read, exceeds a predetermined number Nbth. Specifically, when the number Nb of information terminals, which has been read, is not greater than the predetermined number Nbth (S205b: No), it is determined that the received code identification information corresponds to the information of the information code C attached to the management target T, and the process shifts to S207 to perform the first notification process.

After the affirmation determination information is transmitted to the information terminal 20 by the first notification process, the update process illustrated at S209b is performed, as similar to the first embodiment. At S201, the number Na of times of reception of the received code identification information is incremented. Only when the received terminal identification information is not associated with the received code identification information and the number Nb of information terminals, the database of the storage portion 32 is updated so that the number Nb of information terminals should be incremented (Nb=Nb+1).

By contrast, when it is determined that the number Nb of information terminals, which has been read, exceeds the predetermined number Nbth of times (S205b: Yes), it is determined that different various information terminals repeatedly read the same code identification information. Thus, it is presumed that the information code is excessively forged and a reading evaluation work is performed. In this case, it is determined that the received code identification information does not correspond to the information of the information code C attached to the management target T. In this case, the process shifts to S211, and the second notification process is performed. Incidentally, the predetermined number Nbth may be set arbitrarily in accordance with use environment. Also, the controller 31 performing the determination process of S205b may correspond to an example of a determination means and a determination portion.

As explained above, in the management system 10 according to the present embodiment, the storage portion 32 stores, based on the code identification information and the terminal identification information received from the information terminal 20, the number Nb of the information terminal 20 reading the same code identification information as a part of the management information in which the number Nb of the information terminal 20 reading the same code identification information is associated with the code identification information. The server 30 determines whether the code identification information received from the information terminal 20 corresponds to the information of the information code C attached to the management target T. When the number Nb of the information terminal 20 stored in the storage portion 32 regarding the code identification information exceeds the predetermined number Nbth, it is determined that the code identification information does not correspond to the information of the information code attached to the management target.

Therefore, the server 30 makes the determination while also considering the number Nb of the information terminal 20 reading the same code identification information. For example, when the same code identification information is repeatedly read by various different information terminals 20, it is presumed that the read evaluation work of the information code, which is excessively forged, is performed. It may be possible to notify a possibility that the code identification information does not correspond to the information of the information code C attached to the management target T. Accordingly, it may be possible to further improve reliability regarding the management of a management target T utilizing the information code C.

Incidentally, the authenticity determination process performed in the controller 31 of the server 30 may perform the above described determination based on the reading position information, the reading time, and the number Nb of the information terminal 20 without considering the number Na of times of reception. Specifically, in accordance with use environment, for example, when it is determined to be No at both of S205 and S205b, the process at S207 and after S207 may be performed. When it is determined to be Yes in at least one of S205 or S205b, the process at S211 and after S211 may be performed. Alternatively, when it is determined to Yes at both S205 and S205b, the process at S211 and after S211 may be performed. When it is determined to No in at least one of S205 or S205b, the process at S207 and after S207 may be performed.

Incidentally, the authenticity determination process performed in the controller 31 of the server 30 may perform the determination based on the number Na of times of reception and the number Nb of information terminals without considering the reading position information and the reading time. Specifically, in accordance with the use environment, for example, when it is determined to be No both at S205a and at S205b, the process at S207 and after S207 may be performed. And, when it is determined to be Yes at S205a or at S205b, the process at S211 and after S211 may be performed. When it is determined to be Yes both at S205a and S205b, the process at S211 and after S211 may be performed. When it is determined to be No at S205a or S205b, the process at S207 and after S207 may be performed.

Fourth Embodiment

Figure 7:
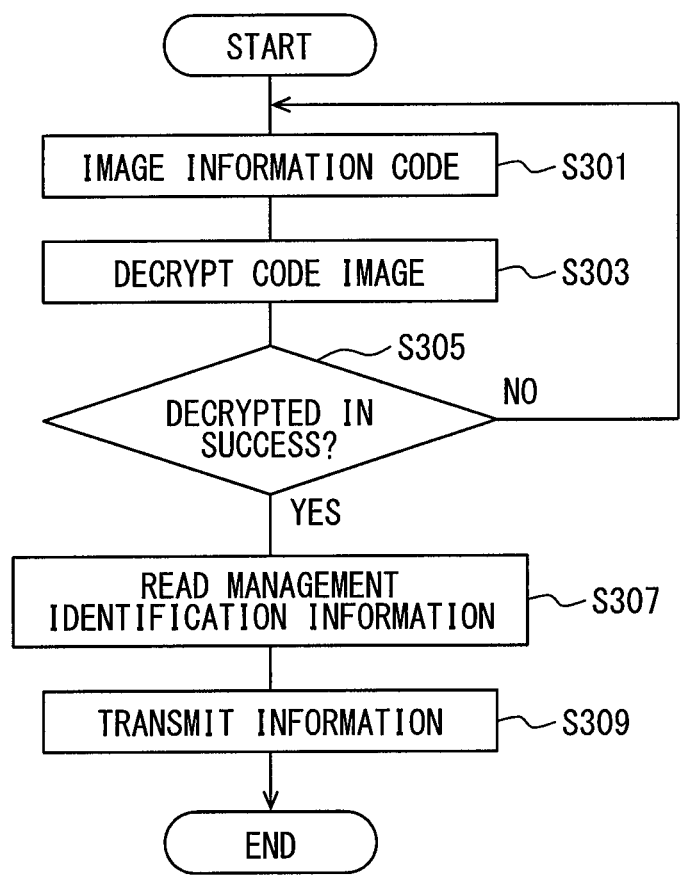
FIG. 7 is a flowchart exemplifying a flow of a registration process by the controller of the information terminal according to a fourth embodiment.
Figure 8:
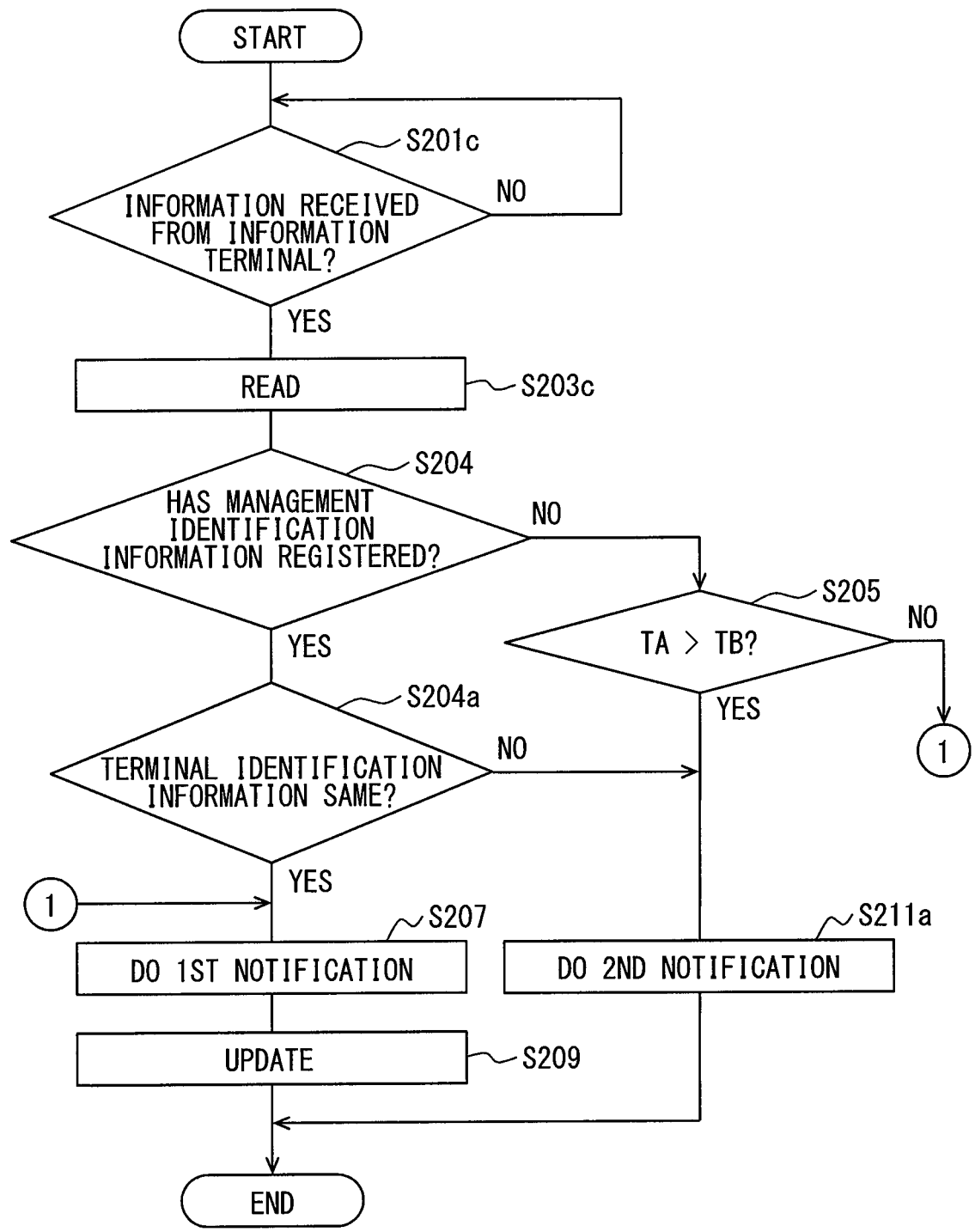
FIG. 8 is a flowchart exemplifying a flow of an authenticity determination process by the controller of the server according to the fourth embodiment.

A management system according to a fourth embodiment of the present disclosure will be explained with reference to FIG. 7 and FIG. 8.

The management system 10 according to the fourth embodiment determines whether the received code identification information corresponds to the information of the information code C attached to the management target T, while considering the terminal identification information for specifying the information terminal 20 and management identification information that is separately prepared. The substantially same configuration in the management system with the first embodiment is given by the identical numerals, and explanations will be omitted.

According to the present embodiment, each management identification information different from the code identification information is prepared for each management target T. When a user purchases a product to be a management target T, the user registers the management identification information by the information terminal 20 held by the user. Therefore, another information terminal different from the information terminal 20 of the user does not display a message such as "it is a registered product" in the notification process. The management identification information may be a serial number that is sealed to prevent a person other than purchaser from seeing, and is attached to the management target T after printing on a piece of paper for sealing, for example. The storage portion 23 of the information terminal 20 stores terminal identification information for specifying the information terminal 20.

Hereinafter, in the management system 10 configured in this way, process executed in the information terminal 20 and the server 30 in the authenticity determination about the management target T by using the information code C will be described in detail by referring to FIG. 7 and FIG. 8.

First, a registration process for registering the management identification information will be explained. The controller 21 of the information terminal 20 held by the user performs the registration process. The registration process will be explained in detail with reference to a flowchart illustrated in FIG. 7.

When a user purchasing the product to be the management target T performs a predetermined key operation to an operation portion 24, the controller 21 executes an application program for registration, so that the registration process starts. The imaging process illustrated at S301 in FIG. 7 is performed when a camera of the imaging portion 22 faces the information code C and an operation for imaging is performed, so that the information code C is imaged by the imaging portion 22. Then, a decryption process illustrated in S303 is performed, and a decoding process is performed to the code image of the information code C imaged by the imaging portion 22 by using information or the like for decoding the encryption and included in the application program for registration.

When the code identification information is decoded by the decoding process (S305: Yes), the process shifts to S307. At S307, the management identification information is read. In this process, the management identification information (for example, a serial number) is imaged in accordance with the operation of the operation portion 24 by the user who corresponds to a purchaser, so that the management identification information is optically read by using optical character recognize (OCR) function. Incidentally, in the process at S307, for example, the management identification information may be read by hand input using the operation portion 24.

Therefore, when the management identification information is read, in the transmission process illustrated in S309, information including the decoded code identification information, the management identification information that is read, and the terminal identification information stored in the storage portion 23 are transmitted to the server 30 through the communication portion 26. By contrast, when the decoding of the information code C is failed, it is determined to be No at S305. In this case, the process returns to S301.

Thus, the information terminal 20 transmits to the server 30, the information including the management identification information and the terminal identification information at the time of transmission of the code identification information, when the management identification information has been read. The server 30, which receives the information from the information terminal 20, registers the received management identification information and the received terminal identification information in association with the code identification information into the database.

Incidentally, when the information terminal 20 performs the reading process, the information terminal 20 transmits the information including the decoded code identification information, the reading position information, the reading time, and the terminal identification information to the server 30. Based on these information received from the server 30 corresponding to the transmission, a result of the authenticity determination of the management target T attached with the information code C is notified.

Next, the authenticity determination process performed by the controller 31 of the server 30 will be explained in detail using the flow chart shown in FIG. 8.

The server 30 performs the process for receiving the information from the information terminal 20. When the server 30 receives the code identification information, the reading position information, the reading time, and the terminal identification information or the like from the information terminal 20 through the communication portion 33 (S201c in FIG. 8: Yes), the reading process illustrated in S203c is performed. In the reading process, the previous reading position information, the previous reading time, the management identification information, and the terminal identification information, which are stored in the storage portion 32 in association with the received code identification information, are read from the database.

At the determination process illustrated at S204, it is determined whether the management identification information has been registered for the received code identification information. Here, when the management identification information has been registered through the registration process in the information terminal 20 or another information terminal (S204: Yes), the process shifts to S204a. In the determination process illustrated at S204a, it is determined whether the received terminal identification information and the terminal identification information read from the database are the same. Here, when the received terminal identification information and the read terminal identification information are the same (S204a: Yes), it is determined that the information terminal 20 corresponds to the information terminal 20 that has been used in registration of the management identification information, and the process at S207 and after S207 is performed.

By contrast, when the management identification information has not been registered for the received code identification information (S204: No), the process as similar to the first embodiment is performed, and the determination process illustrated at S205 is performed. When it is determined that the time TA required for the movement from the previous reading position to the present reading position is not longer than the elapsed time TB from the previous reading time to the present reading time (S205: No), the process at S207 and after S207 is performed as similar to a case of the first embodiment.

In the determination process illustrated in S205, when it is determined that the time TA required for the movement from the previous reading position to the present reading position is longer than the elapsed time TB from the previous reading time to the present reading time (S205: Yes), or when it is determined that the received terminal identification information and the read terminal identification information are different from each other in the determination process illustrated at S204a (S204a: No), the second notification process is performed at S211a.

In the second notification process, the information terminal 20 receiving the code identification information or the like receives the negative determination information as the determination result. Furthermore, when the management identification information has been registered, and also when the management identification information has been registered, the information terminal 20 corresponding to the terminal identification information associated with the management identification information receives predetermined information. Herein, the predetermined information corresponds to a message, for example, indicating the same information code as the information code C attached to the management target T registered by a user has been read. Accordingly, since the display portion 25 displays the predetermined information received by the information terminal 20 that is used in the registration, the user who registers the management identification information can recognize that a forged information code of the information code C attached to the management target C which the user has is likely to be read by another information terminal 20.

When it is determined to be No at S204, the server 30 may transmit information regarding urging to register the management identification information and information regarding merit for a user to the information terminal 20 receiving the code identification information.

In the management system 10 according to the present embodiment, when the management identification information is read at the time of the transmission of the code identification information, the management identification information and the terminal identification information are further transmitted to the server 30. When the management identification information is not read, the terminal identification information is further transmitted to the server 30. The server 30 receives the code identification information that is not associated with the management identification information, the management identification information, and the terminal identification information, so that the code identification information is associated with both of the management identification information and the terminal identification information to be stored in the storage portion 32. The server 30 determines whether the code identification information received from the information terminal 20 corresponds to the information of the information code C attached to the management target T. When the management identification information is associated with the code identification information and stored in the storage portion 32 (S204: Yes) and when the terminal identification information received together with the code identification information is associated with the code identification information and stored in the storage portion 32 (S204a: Yes), it is determined that the code identification information corresponds to the information of the information code C attached to the management target T.

Accordingly, in another information terminal 20 different from the information terminal 20 reading the management identification information for registration first and transmitting the management identification information to the server 30, it is not determined that the read code identification information corresponds to the information of the information code attached to the management target. Thus, it may be possible to further improve reliability regarding the management of the management target T by using the information code C.

Incidentally, the present embodiment is not limited to a case where management identification information is registered by using the information terminal 20 held by a user who purchases a product to be the management target T. But also, the present embodiment may be applied to a case where management identification information is registered by using the information terminal 20 held by a user who manages a product to be a management target T.

Fifth Embodiment

A management system according to a fifth embodiment of the present disclosure will be explained with reference to FIG. 9A, FIG. 9B, FIG. 10A, and FIG. 10B.

In the management system 10 according to the fifth embodiment, management identification information is placed inside a code field of the information code C, which is different from the management system according to the fourth embodiment. The substantially same configuration in the management system with the fourth embodiment is given by the identical numerals, and explanations will be omitted.

Figure 9A:
FIG. 9A is a diagram explaining a part of a management system according to a fifth embodiment, and illustrating a configuration of an information code according to the fifth embodiment.

As illustrated in FIG. 9A, in the present embodiment, the information code C is configured to include a predetermined code field Ca, so that a bright color cell and a dark color cell are arranged inside a predetermined code field Ca, which has a rectangle shape. The inside of the code field Ca includes a specific pattern field Cb, an information storage field Cc, and an empty field Cd. In the specific pattern field Cb, a specific pattern having a predetermined shape is arranged. In the information storage field Cc, the code identification information or the like are stored by multiple bright color cells and dark color cells. In the empty field Cd, any information is not stored by a bright color cell and a dark color cell. Incidentally, as the specific pattern field Cb, for example, a position detection pattern, an alignment pattern, or the like are supposed.

Figure 9B:
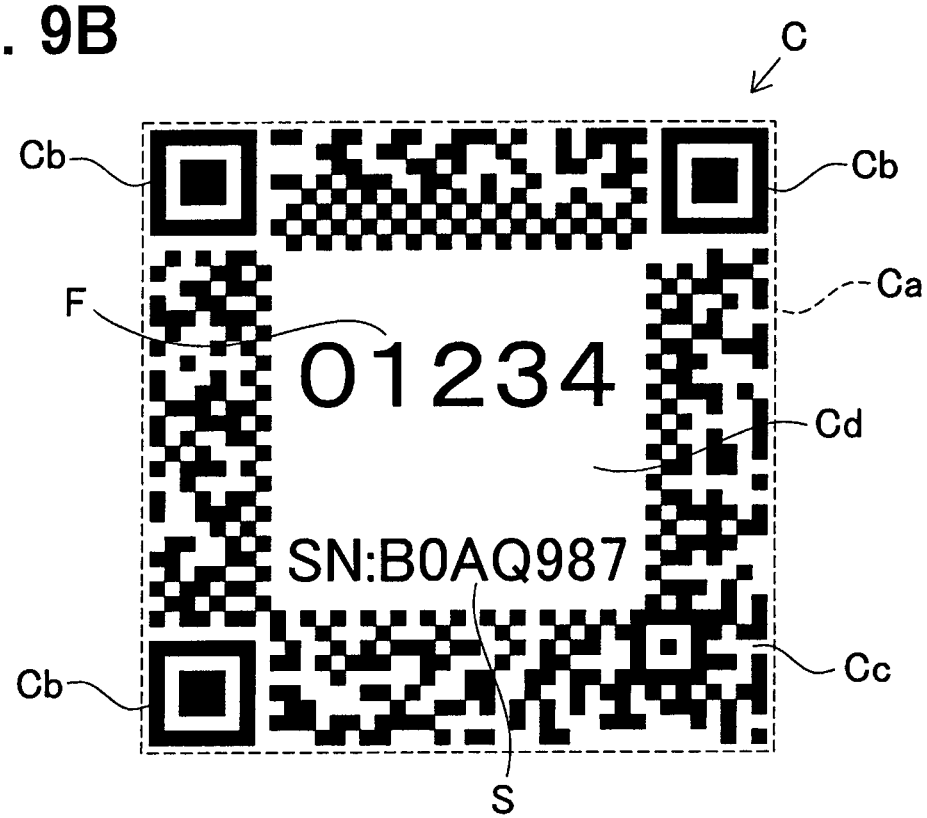
FIG. 9B is a diagram illustrating a state where a management identification information and a serial number are placed in an empty field of the information code described in FIG. 9A.

As illustrated in FIG. 9B, a management identification information F is arranged in the empty field Cd together with the serial number S. According to the present embodiment, it is possible to print to a label, a container box, or the like collectively, the information code C, the management identification information F, and the serial number S. Herein, the serial number S may be information for specifying, for example, a manufacture factory, a product line, or the like. Incidentally, the serial number S may be information (code identification information) for specifying a management target T of a product to which the information code C is attached, and the information code C may store information for specifying a manufacture factory, a product line, or the like. According to this configuration, it may be possible to achieve improvement of work efficiency and reduction of production cost regarding printing or the like of the information code C since the information code C has the same shape in a particular production line or the like.

Figure 10A:
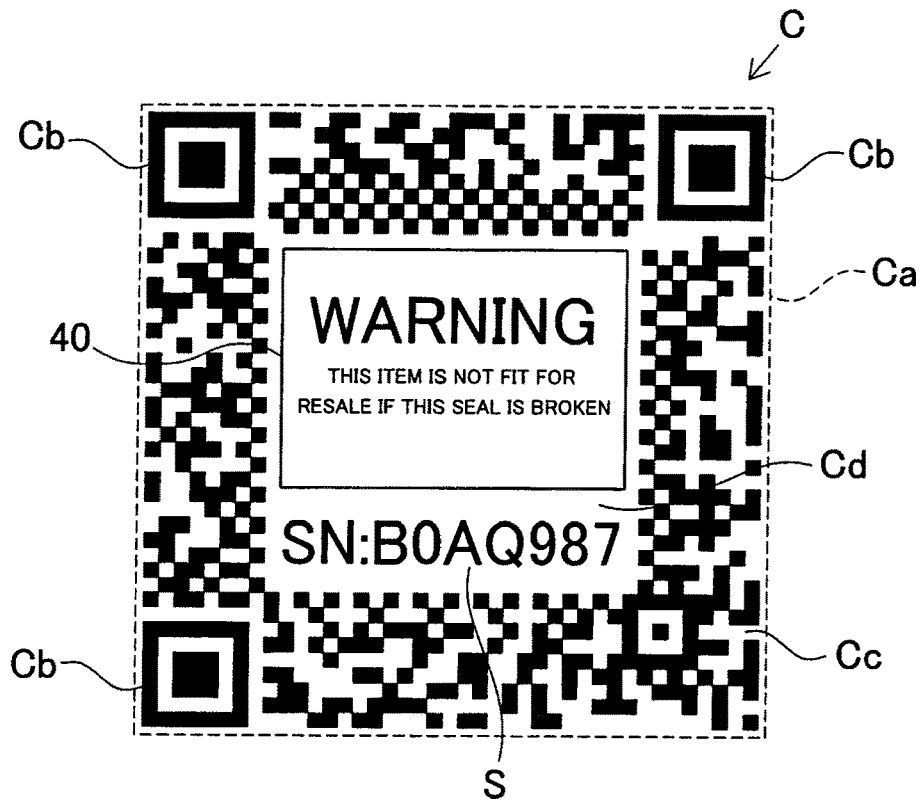
FIG. 10A is a diagram explaining a part of a management system according to a fifth embodiment.

Furthermore, according to the present embodiment, in order to improve confidentiality of the management identification information F, as illustrated in FIG. 10A, only the management identification information F is covered by a covering member 40 in the empty field Cd, so that to be peeled can be recognized. The covering member 40 may be a VOID seal, a seal sticker, or the like.

Figure 10B:
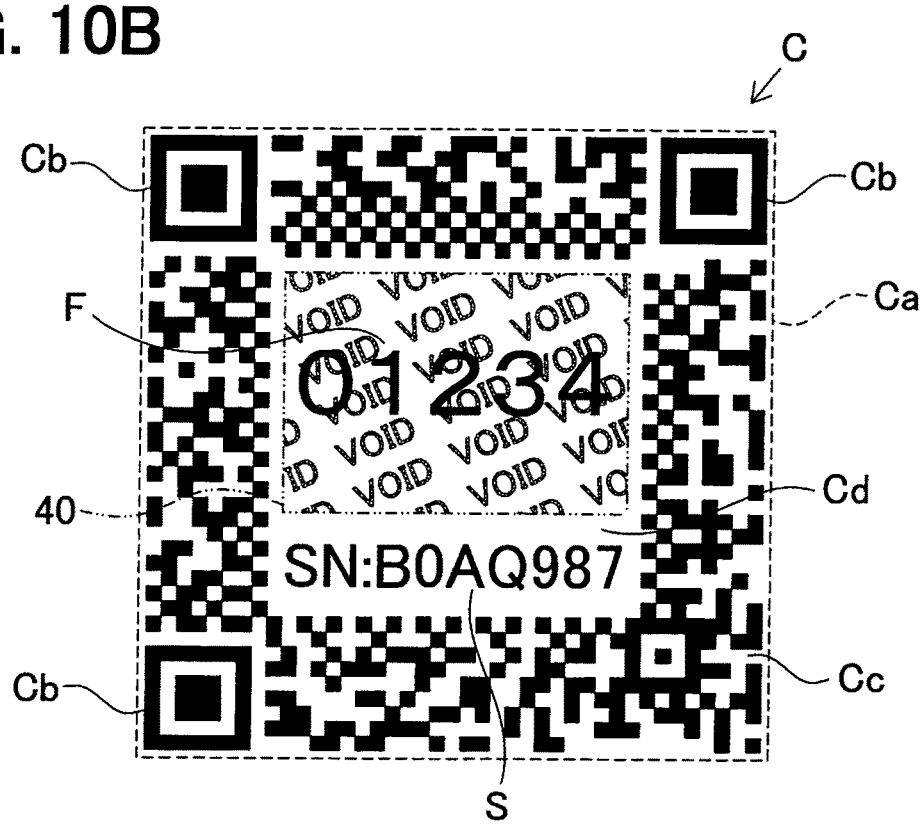
FIG. 10B is a diagram explaining a part of a management system according to the fifth embodiment, and illustrating a state where a covering member described in FIG. 10A has been removed.

Since the management identification information F is covered by the covering member 40, the management identification information F is not recognized unless the covering member 40 is peeled. When the covering member 40 is peeled, a peeling trace is left as illustrated in FIG. 10B, and it may be possible to easily recognize the covering member 40 has been peeled incorrectly.

As explained above, in the management system 10 according to the present embodiment, the information code C includes, inside the code field Ca, the specific pattern field Cb, the information storage field Cc, and the empty field Cd. The management identification information F is placed within the empty field Cd. According to this configuration, the management identification information F is concurrently imaged and is read when the information code C is imaged and is read. Thus, it may be possible to improve convenience regarding reading of the management identification information F. Incidentally, in the registration process, the management identification information F, which is read together with the code identification information, is transmitted to the server 30. By contrast, in the reading process, it is possible to omit the transmission of the management identification information F to the server 30 even when the management identification information F is read together with the code identification information.

Especially, the management identification information F is printed together with the information code C, and covered by the covering member 40 by which peel off of the covering member 40 can be recognized. With this, it is achieved to reduce production cost due to a print of the management identification information F and the information code C collectively, and it may be possible to improve confidentiality of the management identification information F.

Incidentally, the present disclosure is not limited to these embodiments, and for example, the present disclosure may be achieved as follows. The server 30 may notify a management company or the like who sales the management target T of the negative determination information, in addition to the information terminal 20. With this, it may be possible for a management company to easily obtain information regarding a counterfeit of the management target T. The server 30 may transmit the management company of at least a part of information used in the determination, including the affirmative determination information not only the negative determination information.

Regarding the determination process (for example, S205) where it is determined whether the received code identification information corresponds to the information of the information code C attached to the management target T, when it is difficult to determine either one of the affirmative determination or the negative determination due to determination condition or the like, the server 30 may notify the information terminal 20 of information indicating undeterminable or difficult to determine.

The information code C may be generated without encryption in accordance with the use environment so that a general read apparatus can read the information code C, instead of a case where the information code C is encrypted so as to be readable by using the information terminal 20 executing a predetermined application program.

The information terminal 20 may use another position information acquisition means that specifies the position of the information terminal 20 with use of wireless communication so as to obtain the position information, in addition to or instead of acquiring the position information with use of the GPS receiver 27.

According to the present disclosure, regarding whether the code identification information received from the information terminal corresponds the information of the information code attached to the management target, the present reading position information and the present reading time received together with the code identification information may be respectively compared with the previous reading position information and the previous reading time stored in the storage means associated with the code identification information. When the time required for movement from the previous reading position to the present reading position is longer than elapsed time from the previous reading time to the present reading time, it may be determined that the code identification information does not correspond to the information of the information code attached to the management target.

Therefore, when the time required for the movement from the previous reading position to the present reading position is longer than the elapsed time from the previous reading time to the present reading time, it may be likely that the information code not to be the management target is read. It may be possible to notify a user having the information terminal of a determination result in which the code identification information does not correspond to the information of the information code attached to the management target, that is, a possibility that the forged information code is read.

Further, according to the present disclosure, regarding whether the code identification information received from the information terminal corresponds to the information of the information code attached to the management target, the determine portion may make a determination based on the reading position information and the reading time received together with the code identification information, and the management information stored in the storage means and including the number of times of reception.

With this, since the determination is performed while considering the number of times of reception, for example, when the same code identification information is repeatedly read, it may be possible to presume the reading as the read evaluation work of the excessively forged information code even in a particular area. Thus, it may be possible to notify a possibility that the code identification information does not correspond to the information of the information code attached to the management target. Accordingly, it may be possible to further improve reliability regarding the management of the management target utilizing the information code.

Furthermore, according to the present disclosure, the information terminal may transmit the code identification information that has been read by the reading means to the server. In this case, the determination means of the server may determine whether the code identification information received from the information terminal corresponds to the information of the information code attached to the management target, based on the management information including the number of times of reception stored in the storage means with regard to the code identification information. The server may transmit the determination result to the information terminal. The notification means of the information terminal notifies the information regarding the determination result received from the server.

According to this configuration, since the server makes the determination while considering the number of times of reception of the code identification information, when the same code identification information is repeatedly read, it is presumed that a read evaluation work of the excessively forged information code is performed. Thus, it may be possible to notify a possibility that the code identification information does not correspond to the information of the information code attached to the management target T. In other words, it may be possible to notify a user of the information terminal of a possibility that the information terminal reads the forged information code. Thus, it may be possible to improve reliability regarding the management of the management target utilizing the information code.

Furthermore, the storage means may store the number of information terminal reading the same code identification information as a part of the management information in associated with the code identification information, based on the code identification information and the terminal identification information received from the information terminal. Regarding whether the code identification information received from the information terminal, the determination means determines that the code identification information does not correspond to the information of the information code attached to the management target, when the number of information terminal stored in the storage means with respect to the code identification information exceeds a predetermined number.

Therefore, since the above determination is performed while considering the number of information terminals having read the same code identification information, for example, when various different information terminals repeatedly read the same code identification information, it is presumed that the read evaluation work of the excessively forged information code is performed. It may be possible to notify a possibility that the code identification information does not correspond to the information of the information code attached to the management target. Accordingly, it may be possible to further improve reliability regarding the management of the management target utilizing the information code.

Furthermore, at the time of transmission of the code identification information, when the reading means further reads the management identification information, the information terminal may transmit the management identification information and the terminal identification information to the server. When the reading means does not read the management identification information, the information terminal may transmit the terminal identification information to the server. The code identification information that is not associated with the management identification information is received together with the management identification information and the terminal identification information. Therefore, the storage means associates the management identification information and the terminal identification information with respect to the code identification information and stores them. Regarding whether the code identification information received from the information terminal corresponds to the information of the information code attached to the management target, the determination means determines that the code identification information corresponds to the information of the information code attached to the management target when the management identification information associated with the code identification information is stored in the storage means, and also when the terminal identification information received together with the code identification information associated with the code identification information is stored in the storage means.

Accordingly, in another information terminal different from the information terminal reading the management identification information first and transmitting to the server, it is not determined that the code identification information, which has been read, corresponds to the information of the information code attached to the management target. Thus, it may be possible to further improve reliability regarding the management of the management target by using the information code.

Furthermore, the information code may include, inside the code field, the specific pattern field, the information storage field, and the empty field. The management identification information is placed in the empty field. According to this configuration, the management identification information is concurrently imaged and is read when the information code is imaged and is read. Thus, it may be possible to improve convenience regarding reading of the management identification information F.

Furthermore, the management identification information may be printed together with the information code, and covered by the covering member by which peel off of the covering member can be recognized. With this, it may be achieved to reduce production cost due to a print of the management identification information and the information code collectively, and it may be possible to improve confidentiality of the management identification information.

It is noted that a flowchart or the process of the flowchart in the present application includes steps (also referred to as sections), each of which is represented, for instance, as S101. Further, each step can be divided into several sub-steps while several steps can be combined into a single step.

While the embodiments, the configurations, the aspects of a management system have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A management system comprising:
   an information terminal that reads an information code attached to a management target, the information code storing code identification information that specifies the management target; and
   a server that is communicable with the information terminal,
   wherein
   the information terminal includes:
      a reading portion that optically reads display information including the information code;
      a position information acquisition portion that acquires position information of the information terminal;
      a terminal-side transmission portion that transmits the position information acquired by the position information acquisition portion as reading position information together with the code identification information to the server, when the reading portion reads the code identification information; and
      a notification portion that notifies predetermined information,
   the server includes:
      a storage portion that stores management information with respect to the management target;
      a determination portion that determines whether the code identification information received from the information terminal corresponds to information of the information code attached to the management target, based on the reading position information received with the code identification information, a reading time that is received with the code identification information and is considered that the code identification information has been read, and the management information stored in the storage portion; and
      a server-side transmission portion that transmits a determination result by the determination portion to the information terminal, and
   the notification portion notifies information with respect to the determination result received from the server,
   wherein:
   the storage portion stores previous reading position information and a previous reading time at a previous reception time of the code identification information in association with the code identification information, as a part of the management information;
   the determination portion determines whether the code identification information received from the information terminal corresponds to the information of the information code attached to the management target;
   the determination portion compares present reading position information and a present reading time, which are received in this time together with the code identification information, and the previous reading position information and the previous reading time, which are stored in the storage portion in association with the code identification information; and
   the determination portion determines that the code identification information does not correspond to the information of the information code attached to the management target in a case when a time required for movement from the previous reading position to the present reading position is longer than an elapsed time from the previous reading time to the present reading time.

2. A management system comprising:
   an information terminal that reads an information code attached to a management target, the information code storing code identification information that specifies the management target; and
   a server that is communicable with the information terminal,
   wherein
   the information terminal includes:
      a reading portion that optically reads display information including the information code;
      a position information acquisition portion that acquires position information of the information terminal;

a terminal-side transmission portion that transmits the position information acquired by the position information acquisition portion as reading position information together with the code identification information to the server, when the reading portion reads the code identification information; and a notification portion that notifies predetermined information, the server includes:

a storage portion that stores management information with respect to the management target;

a determination portion that determines whether the code identification information received from the information terminal corresponds to information of the information code attached to the management target, based on the reading position information received with the code identification information, a reading time that is received with the code identification information and is considered that the code identification information has been read, and the management information stored in the storage portion; and a server-side transmission portion that transmits a determination result by the determination portion to the information terminal, and the notification portion notifies information with respect to the determination result received from the server, wherein:

the storage portion stores a number of times of reception of the code identification information received from the information terminal as a part of the management information;

the determination portion determines, based on the reading position information and the reading time received together with the code identification information and the number of times of reception stored in the storage portion, whether the code identification information received from the information terminal corresponds to the information of the information code attached to the management target.

3. A management system comprising:

an information terminal that reads an information code attached to a management target, the information code storing code identification information that specifies the management target; and a server that is communicable with the information terminal, wherein the information terminal includes:

a reading portion that optically reads display information including the information code;

a position information acquisition portion that acquires position information of the information terminal;

a terminal-side transmission portion that transmits the position information acquired by the position information acquisition portion as reading position information together with the code identification information to the server, when the reading portion reads the code identification information; and a notification portion that notifies predetermined information, the server includes:

a storage portion that stores management information with respect to the management target;

a determination portion that determines whether the code identification information received from the information terminal corresponds to information of the information code attached to the management target, based on the reading position information received with the code identification information, a reading time that is received with the code identification information and is considered that the code identification information has been read, and the management information stored in the storage portion; and a server-side transmission portion that transmits a determination result by the determination portion to the information terminal, and the notification portion notifies information with respect to the determination result received from the server, wherein:

the terminal-side transmission portion further transmits to the server, terminal identification information specifying the information terminal at a time of transmission of the code identification information;

the storage portion stores number of the information terminal having read identical code identification information as a part of the management information in association with the code identification information, based on the code identification information and the terminal identification information received from the information terminal;

the determination portion determines whether the code identification information received from the information terminal corresponds to the information of the information code attached to the management target; and the determination portion determines that the code identification information does not correspond to the information of the information code attached to the management target when the number of the information terminal stored in the storage portion with respect to the code identification information exceeds a predetermined number.

4. A management system comprising:

an information terminal that reads an information code attached to a management target, the information code storing code identification information that specifies the management target; and a server that is communicable with the information terminal, wherein the information terminal includes:

a reading portion that optically reads display information including the information code;

a position information acquisition portion that acquires position information of the information terminal;

a terminal-side transmission portion that transmits the position information acquired by the position information acquisition portion as reading position information together with the code identification information to the server, when the reading portion reads the code identification information; and a notification portion that notifies predetermined information, the server includes:

a storage portion that stores management information with respect to the management target;

a determination portion that determines whether the code identification information received from the information terminal corresponds to information of the information code attached to the management target, based on the reading position information received with the code identification information, a reading time that is received with the code identification information and is considered that the code identification information has been read, and the management information stored in the storage portion; and a server-side transmission portion that transmits a determination result by the determination portion to the information terminal, and the notification portion notifies information with respect to the determination result received from the server, wherein:

the management target includes management identification information that is different from the code identification information;

when the reading portion has read the management identification information at a time of transmission of the code identification information, the terminal-side transmission portion further transmits to the server, the management identification information and terminal identification information specifying the information terminal;

when the reading portion does not have read the management identification information, the terminal-side transmission portion further transmits the terminal identification information to the server;

the storage portion receives the management identification information, the terminal identification information, and the code identification information that is not associated with the management identification information so as to associate and store the management identification information and the terminal identification information for the code identification information;

the determination portion determines whether the code identification information received from the information terminal corresponds to the information of the information code attached to the management target; and when the management identification information associated with the code identification information is stored in the storage portion, and also when the terminal identification information received together with the code identification information is stored in the storage portion in association with the code identification information, the determination portion determines that the code identification information corresponds to the information of the information code attached to the management target.

5. The management system according to claim 4, wherein:

the information code is configured so that a bright color cell and a dark color cell are arranged inside a predetermined code field;

the code field includes a specific pattern field, an information storage field, and an empty field, wherein a specific pattern having a predetermined shape is arranged in the specific pattern field, a plurality of bright color cells and dark color cells in the information storage field store the code identification information, the empty field stores no information by the bright color cells and the dark color cells; and the empty field stores the management identification information.

6. The management system according to claim 5, wherein:

the management identification information is printed with the information code, and is covered by a covering member; and a peel off of the covering member is recognized.

7. A management system comprising:

an information terminal that reads an information code attached to a management target, the information code storing code identification information that specifies the management target; and a server that is communicable with the information terminal, wherein the information terminal includes:

a reading portion that optically reads display information including the information code;

a terminal-side transmission portion that transmits to the server, the code identification information read by the reading portion; and a notification portion that notifies predetermined information, the server includes:

a storage portion that stores management information with respect to the management target, the management information including a number of times of reception of the code identification information received from the information terminal;

a determination portion that determines whether the code identification information received from the information terminal corresponds to information of the information code attached to the management target, based on the management information including the number of times of reception stored in the storage portion with respect to the code identification information; and a server-side transmission portion that transmits a determination result by the determination portion to the information terminal, and the notification portion notifies information with respect to the determination result received from the server, wherein:

the terminal-side transmission portion further transmits to the server, terminal identification information specifying the information terminal at a time of transmission of the code identification information;

the storage portion stores number of the information terminal having read identical code identification information as a part of the management information in association with the code identification information, based on the code identification information and the terminal identification information received from the information terminal;

the determination portion determines whether the code identification information received from the information terminal corresponds to the information of the information code attached to the management target; and the determination portion determines that the code identification information does not correspond to the information of the information code attached to the management target when the number of the information terminal stored in the storage portion with respect to the code identification information exceeds a predetermined number.

8. A management system comprising:

an information terminal that reads an information code attached to a management target, the information code storing code identification information that specifies the management target; and a server that is communicable with the information terminal, wherein the information terminal includes:

a reading portion that optically reads display information including the information code;

a terminal-side transmission portion that transmits to the server, the code identification information read by the reading portion; and a notification portion that notifies predetermined information, the server includes:

a storage portion that stores management information with respect to the management target, the management information including a number of times of reception of the code identification information received from the information terminal;

a determination portion that determines whether the code identification information received from the information terminal corresponds to information of the information code attached to the management target, based on the management information including the number of times of reception stored in the storage portion with respect to the code identification information; and a server-side transmission portion that transmits a determination result by the determination portion to the information terminal, and the notification portion notifies information with respect to the determination result received from the server, wherein:

the management target includes management identification information that is different from the code identification information;

when the reading portion has read the management identification information at a time of transmission of the code identification information, the terminal-side transmission portion further transmits to the server, the management identification information and terminal identification information specifying the information terminal;

when the reading portion does not have read the management identification information, the terminal-side transmission portion further transmits the terminal identification information to the server;

the storage portion receives the management identification information, the terminal identification information, and the code identification information that is not associated with the management identification information so as to associate and store the management identification information and the terminal identification information for the code identification information;

the determination portion determines whether the code identification information received from the information terminal corresponds to the information of the information code attached to the management target; and when the management identification information associated with the code identification information is stored in the storage portion, and also when the terminal identification information received together with the code identification information is stored in the storage portion in association with the code identification information, the determination portion determines that the code identification information corresponds to the information of the information code attached to the management target.

9. The management system according to claim 8, wherein:

the information code is configured so that a bright color cell and a dark color cell are arranged inside a predetermined code field;

the code field includes a specific pattern field, an information storage field, and an empty field, wherein a specific pattern having a predetermined shape is arranged in the specific pattern field, a plurality of bright color cells and dark color cells in the information storage field store the code identification information, the empty field stores no information by the bright color cells and the dark color cells; and the empty field stores the management identification information.

10. The management system according to claim 9, wherein:

the management identification information is printed with the information code, and is covered by a covering member; and a peel off of the covering member is recognized.

* * * * *